Figure 1:
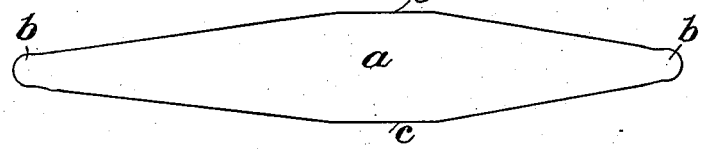

J. H. MORGAN.
SHELF AND OTHER LIKE BRACKET.
APPLICATION FILED SEPT. 23, 1910.

1,028,590.

Patented June 4, 1912.
2 SHEETS—SHEET 1.

Inventor
John H. Morgan
by Meyers, Cushman & Rea
Attorneys

Witnesses

J. H. MORGAN.
SHELF AND OTHER LIKE BRACKET.
APPLICATION FILED SEPT. 23, 1910.
1,028,590.
Patented June 4, 1912.
2 SHEETS—SHEET 2.
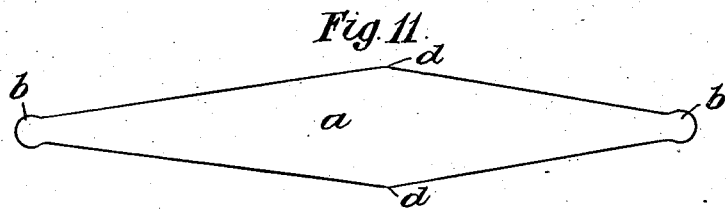
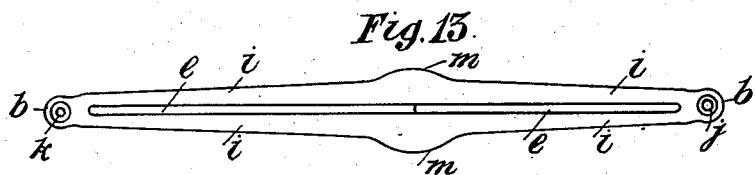
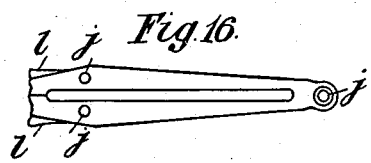
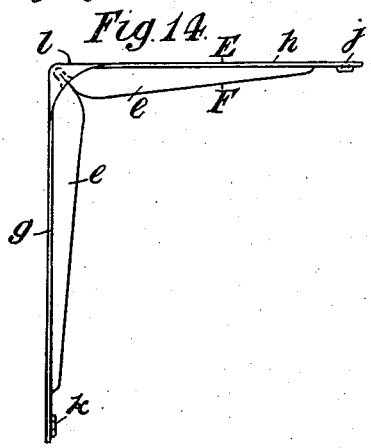
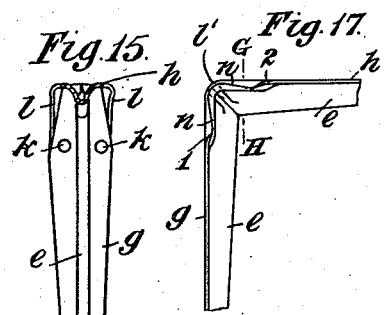
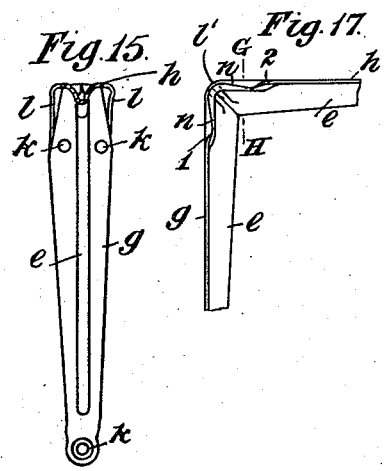
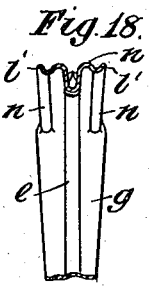
Witnesses
Inventor
John H. Morgan
by
Attorneys

UNITED STATES PATENT OFFICE.

JOHN HENRY MORGAN, OF HARROGATE, ENGLAND.

SHELF AND OTHER LIKE BRACKET.

1,028,590.  Specification of Letters Patent.  Patented June 4, 1912.

Application filed September 23, 1910. Serial No. 583,424.

*To all whom it may concern:*

Be it known that I, JOHN HENRY MORGAN, of The Grange, Harlow Oval, Harrogate, in the county of York, England, have invented new and useful Improvements in or Relating to Shelf and other Like Brackets, of which the following is a specification.

This invention relates to improvements in brackets used for supporting shelves and other like articles for which such brackets are employed, of the type formed out of a single blank of sheet metal which is stamped to the required shape in dies, provided with a central rib either in one piece, or divided into two portions and riveted together, and in which one or more V-shaped, or rectangular, or other shaped orifices have been cut in the blank to form a butt joint, or to receive a strutt, or in which blanks folded to a T section have been notched at the angle bend.

The object of this invention is to form or construct a bracket by stamping or bending out of a single diamond shaped blank, or a blank made parallel, or slightly to taper from each of its ends and on each side of its center line with or without a diamond shaped or bulged portion which unites the two ends together, and with a strengthening rib formed out of such blank without the blank being cut or perforated as described in the United States of America patent specification No. 852975, and at the same time providing the bracket with the smallest possible curve at the corner formed where the two portions of the blank are turned at a right angle to each other. In this invention the rib is provided with a V-shaped recess or indent formed by stamping and folding, and it is made to form an abutment for the two portions and which will be kept in contact with each other by the weight of the shelf, or the goods placed thereon, without riveting or other means of securing the two portions of the rib together. By this invention a light and perfectly strong bracket can be made at a very small cost without being weakened by perforating the blank or allowing any portion of the ribs to overlap or envelop each other.

In the drawings hereunto annexed I have shown two methods of carrying this invention into practice.

Figure 3:
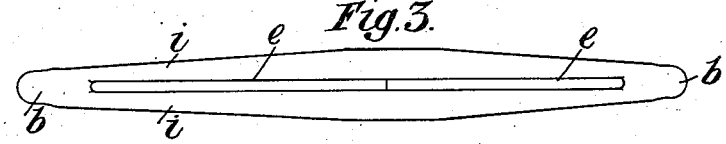
Figure 2:
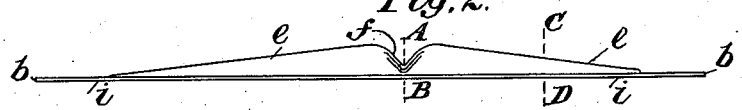
Figure 4:
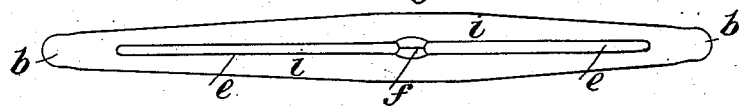
Figure 10:
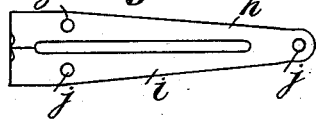
Figure 5:
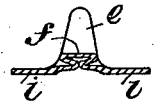
Figure 6:
Figure 8:
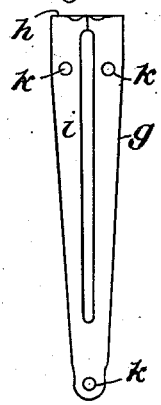
Figure 7:
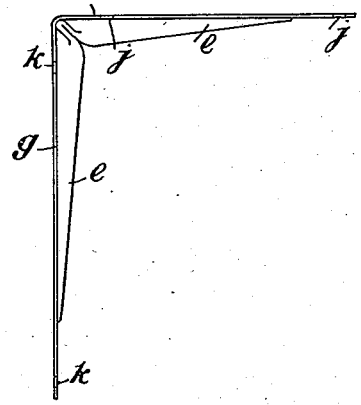
Figure 9:
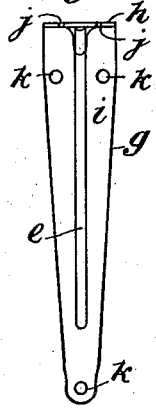

Figure 1 is a plan of a blank without box corners constructed according to this invention; Fig. 2 is an elevation of the blank showing the rib formed with V-shaped recess or indent therein; Fig. 3 is a plan looking at the top of Fig. 2; Fig. 4 is a plan looking at the underside of Fig. 2; Fig. 5 is a transverse section on line A, B, Fig. 2; Fig. 6 is a transverse section on line C, D, Fig. 2; Fig. 7 is an elevation of the complete bracket; Fig. 8 is an end elevation of the left hand side of Fig. 7; Fig. 9 is an end elevation of the right hand side of Fig. 7; Fig. 10 is a plan looking at the top of Fig. 7; Fig. 11 is a plan of a blank for constructing a bracket with box corners according to this invention; Fig. 12 is an elevation showing the rib formed with the V-shaped recess or indent therein; Fig. 13 is a plan looking on the top of Fig. 12; Fig. 14 is an elevation of the complete bracket; Fig. 15 is an elevation and part section on line E, F, Fig. 14; Fig. 16 is a plan looking at the top of Fig. 14; Fig. 17 is a part elevation of a bracket with a corrugated corner; Fig. 18 a sectional elevation on line G, H, Fig. 17.

Like parts in all the views are marked with similar letters of reference.

$a$ is the blank of sheet metal of any suitable length, width, and thickness, say, shaped somewhat like an elongated diamond with round or shaped ends $b$. At Fig. 1 the blank is shown with round ends $b$ and with portions $c$, $c$ at suitable distances from each of the round ends made parallel or to taper for a certain distance from each end $b$, and then to gradually, either by straight or inclined lines, or curved, to increase in width until they are united together either at an angle to each other or by curves $d$, $d$, Fig. 11. The blank may be cut to the required shape by dies, or in any other suitable or convenient manner. After being cut to shape it is placed in suitable dies, and by means of stamping or pressing a central rib $e$ is formed. The rib is made to taper a suitable distance from each end $b$ of the blank toward its center, or a longer distance from one end of the blank than from the other. In the blank is formed by stamping and folding in dies a V-shaped recess or indent $f$ as shown at Figs. 2 and 12. The distance of the V-shaped recess from each end of the blank will be determined by the lengths of the wall plate $g$ and shelf plate $h$. The recess $f$ thus formed in the rib $e$ is flattened out and partially fills the recess at this point, as well as form a bearing surface. The angle of the sides of the recess may approximately be, say, at or about an angle of forty-five degrees. The portion $i$, $i$, of the blank on each side of the rib is, during the stamping or pressing operation, turned out at a right angle to the rib so as to form a flange which constitutes the wall and shelf plates $g$ and $h$ when the portions of the bracket are turned at or about a right angle to each other, as shown at Figs. 7 and 14. The portion of the blank to the right hand of the recess $f$ forms the shelf plate $h$, while the portion to the left hand of the said recess forms the wall plate $g$, and when these two portions are turned at a right angle to each other the flattened portions of the recess $f$ are brought together and made to abut against each other, as shown at Figs. 7 and 14, and thus form a natural support or stop for receiving the pressure that may be placed upon the horizontal arm or shaft supporting portion $h$ of the bracket.

Holes $j$, $k$ may be formed in the shelf and wall plates $g$ and $h$ through which screws or nails, or other means of fixing are passed for fixing the said parts in position.

When it is desired to form a corner piece $l$ on the flanges of the bracket in order to obtain greater strength, then the bracket may be placed in another set of suitable dies so constructed as not only to bring the rib portions $e$, $e$, and wall and shelf plates at a right angle to each other, but also to draw out the outside of the projections $m$ on the flanges $i$, $i$, Fig. 13 to form the box corners $l$, $l$ Fig. 14. Or, the corrugated corners $l^1$ $l^1$ Fig. 18, that is to say, a number of corrugations $n$, $n$ are formed in the flanges $i$, $i$ on each side of the central web $e$ between the points 1 and 2 of Fig. 17. The portions thus drawn out form a box corner $l$ as shown at Fig. 14, or of the shape shown at $l^1$ Fig. 17 with the result that when the two formed portions of the ribs are in contact with each other greater strength is imparted to the bracket and the riveting or welding, or otherwise securing the two portions of the ribs is dispensed with.

Brackets constructed according to this invention having its horizontal arm turned at a right angle to its wall plate fit closely into the corner without any large curve through which dust and vermin may pass and accumulate in the hollow of the rib, and they are much stronger than when the rib is simply curved over as there is little or no danger of the material breaking when the shelf plate is turned or bent at or about a right angle to the wall plate.

What I claim is:—

1. A bracket formed of a single blank of sheet metal having a central longitudinal rib, the walls of which are spaced from each other and a flange on each side of said rib, a V-shaped depression being formed in said rib by which the walls of the rib are spread laterally and form flat abutting surfaces, said rib gradually increasing in height from each end to said notch, said flanges being bent approximately at a right angle to bring the opposite flat surfaces into contact and thereby provide a support for the outwardly projecting arm of the bracket.

2. A bracket formed from a single elongated diamond shaped blank of sheet metal, comprising a central folded hollow tapering rib, a tapering flange on each side of the rib, a protuberance on each flange at a suitable distance from the ends of the blank, a V-shaped indent recess with flattened faces formed in the rib, a portion of each portion of the rib and flanges bent approximately at a right angle until one flattened face rests upon the other and the said protuberance turned at or about a right angle into strengthening corner pieces on the outer edges of the flanges.

3. A bracket consisting of a hollow folded central rib formed out of a flat blank of sheet metal formed to the required shape in dies, said rib having a flange and a protuberance on each side thereof, a V-shaped indent recess in the upper surface of the rib forming opposed flattened faces, corrugations in the flanges for a distance on each side of the V-shaped recess, said rib and flanges being bent approximately at right angles until one of the said flattened faces is in contact with the other, turning in the protuberance to form strengthening corner pieces along and at right angles to the outer edges of the flanges, and means for securing the two flattened faces of the V-shaped recess together.

JOHN HENRY MORGAN.

Witnesses:
 FREDERICK PIATT,
 JAMES WHITELAW.

---

Copies of this patent may be obtained for five cents each, by addressing the "Commissioner of Patents, Washington, D. C."